(12) United States Patent
Bennett et al.

(10) Patent No.: US 7,339,809 B2
(45) Date of Patent: Mar. 4, 2008

(54) SYSTEMS AND METHODS FOR ELECTRICAL POWER REGULATION AND DISTRIBUTION IN AIRCRAFT

(75) Inventors: David D. Bennett, Clinton, WA (US); Douglas S. York, Langley, WA (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 10/999,626

(22) Filed: Nov. 30, 2004

(65) Prior Publication Data

US 2006/0113839 A1    Jun. 1, 2006

(51) Int. Cl.
- H02M 5/293 (2006.01)
- H02M 5/00 (2006.01)
- H03D 3/24 (2006.01)
- H03D 3/02 (2006.01)

(52) U.S. Cl. ............... 363/163; 363/164; 329/325; 329/321

(58) Field of Classification Search ............ 363/163, 363/164, 153–157, 159, 165, 171, 148–149, 363/160, 65, 124, 39, 161–162, 1, 8–10, 363/172, 177; 329/325, 326, 323, 329, 321, 329/342; 455/76
See application file for complete search history.

(56) References Cited

U.S. PATENT DOCUMENTS

| | | | |
|---|---|---|---|
| 2,686,261 A | 8/1954 | Toulon | |
| 3,247,432 A | 4/1966 | Robinson | |
| 3,409,817 A | 11/1968 | Gillett | |
| 3,517,297 A | 6/1970 | Durio et al. | |
| 3,535,611 A | 10/1970 | Toulemonde | |
| 3,564,434 A * | 2/1971 | Camenzind et al. | 329/326 |
| 3,818,315 A * | 6/1974 | Gyugyi et al. | 363/160 |
| 3,931,563 A | 1/1976 | Stacey | |
| 3,931,565 A | 1/1976 | Hase | |
| 4,220,989 A | 9/1980 | Perilstein | |
| 4,468,725 A | 8/1984 | Venturini | |
| 4,499,533 A | 2/1985 | Okamoto | |
| 4,602,217 A * | 7/1986 | Shinkawa | 329/326 |
| 4,675,802 A | 6/1987 | Sugimoto | |
| 4,777,581 A | 10/1988 | Smith | |

(Continued)

FOREIGN PATENT DOCUMENTS

EP    0903841 A1    3/1999

OTHER PUBLICATIONS

PCT International Search Report and Written Opinion for Application No. PCT/US2005/042717, dated Nov. 14, 2006, 20 pages.

*Primary Examiner*—Bao Q. Vu
*Assistant Examiner*—Harry Behm
(74) *Attorney, Agent, or Firm*—Lee & Hayes, PLLC

(57) ABSTRACT

The present invention comprises systems and methods for electrical power regulation and distribution. In an embodiment, a system includes a modulator coupled to the source that receives an unregulated output waveform and is operable to produce a first composite waveform, and a mixing unit that is operable to generate a second composite waveform by introducing a frequency modulated component into the first composite waveform. A demodulator is coupled to the mixing unit that demodulates the second composite waveform to generate a third composite waveform. A filter network is coupled to the demodulator that is configured to select a desired spectral portion of the third composite waveform.

29 Claims, 6 Drawing Sheets

U.S. PATENT DOCUMENTS

| | | |
|---|---|---|
| 4,819,148 A | 4/1989 | Klein et al. |
| 4,858,100 A | 8/1989 | Tatara |
| 5,023,769 A | 6/1991 | Beland |
| 5,218,522 A | 6/1993 | Phelps et al. |
| 5,311,419 A | 5/1994 | Shires |
| 5,398,002 A * | 3/1995 | Bang ......................... 329/302 |
| 5,638,263 A | 6/1997 | Opal et al. |
| 5,684,391 A | 11/1997 | Weinfurtner et al. |
| 5,737,198 A * | 4/1998 | Larsen et al. ................. 363/40 |
| 5,757,633 A | 5/1998 | Bowles |
| 5,886,893 A | 3/1999 | Asai et al. |
| 5,894,414 A | 4/1999 | Jiang |
| 5,969,966 A | 10/1999 | Sawa et al. |
| 6,018,466 A * | 1/2000 | Lucian ........................ 363/16 |
| 6,043,721 A * | 3/2000 | Nagode et al. ............. 332/117 |
| 6,100,673 A * | 8/2000 | Bair et al. .................. 323/255 |
| 6,104,624 A | 8/2000 | Iwamoto et al. |
| 6,286,609 B1 | 9/2001 | Carrier et al. |
| 6,466,468 B1 | 10/2002 | York |
| 6,621,721 B2 | 9/2003 | York |
| 6,690,588 B2 | 2/2004 | York |
| 6,806,662 B1 | 10/2004 | York |
| 6,807,076 B1 | 10/2004 | York |

\* cited by examiner

SYSTEMS AND METHODS FOR ELECTRICAL POWER REGULATION AND DISTRIBUTION IN AIRCRAFT

FIELD OF THE INVENTION

This invention relates generally to electric power distribution, and more particularly, to systems and methods for regulating and configuring electrical power systems in aircraft.

BACKGROUND OF THE INVENTION

An aircraft typically includes an electrical power system that generates and supplies electrical power to various aircraft systems and subsystems. For example, the electrical power system may be operable to supply electrical power to lighting, avionics, passenger entertainment and flight control systems to enable the foregoing systems to perform their respective functions. The electrical power system generally includes one or more electrical alternators that are driven by the engines of the aircraft. The one or more alternators accordingly deliver alternating current (AC) to selected aircraft systems, and may also deliver direct current (DC) to other systems configured for DC, such as electrical storage batteries, by rectifying the AC generated by the alternators.

Since the power generated by the electrical alternators varies with the rotational speed of the armature within the alternators, changes in propulsive thrust from the engines generally result in variations in the power transferred to the various aircraft systems. In one known method, an aircraft alternator is coupled to a constant speed drive that includes a variable-output hydraulic pump that is driven by the engine of the aircraft. The hydraulic pump drives a hydraulic motor that is coupled to the alternator so that the alternator is driven at a relatively constant rotational speed. Accordingly, the alternator is operated at a relatively constant speed at various propulsive thrust settings by regulating the flow of hydraulic fluid to the hydraulic motor.

Although the foregoing system is effective to impart a relatively constant speed to the alternator so that a relatively constant voltage and frequency is provided to the various aircraft systems, it nevertheless exhibits significant disadvantages. For example, the added complexity of the foregoing system generally increases the amount of maintenance activity required to properly maintain the system. Since the added complexity may also contribute to a lower overall system reliability, dispatch efficiency may be adversely impacted. Since the foregoing system interposes a hydraulic drive mechanism between the engine and the alternator, the weight of the aircraft is also adversely affected.

Accordingly, what is needed in the art is a system and method for regulating electrical power distribution that is that is simpler than existing systems. Furthermore, in aircraft distribution systems, there is a continuing need for lighter and more reliable systems than are currently available.

SUMMARY OF THE INVENTION

The present invention comprises systems and methods for electrical power regulation and distribution. In one aspect of the invention, a system includes a modulator coupled to the source that receives an unregulated output waveform and is operable to produce a first composite waveform, and a mixing unit that is operable to generate a second composite waveform by introducing a frequency modulated component into the first composite waveform. A demodulator is coupled to the mixing unit that demodulates the second composite waveform to generate a third composite waveform. A filter network is coupled to the demodulator that is configured to select a desired spectral portion of the third composite waveform.

In another aspect, the invention includes a modulator coupled to an alternating current (AC) power source that generates an unregulated waveform, and a filter network coupled to the modulator that is operable to receive a waveform from the modulator and generate a filtered waveform. At least one demodulator is coupled to the mixing unit that demodulates the filtered waveform to generate a demodulated waveform. A regulation stage is coupled to the at least one demodulator to receive the demodulated waveform and to regulate at least one of a power level, a voltage or a current delivered to a load.

In still another aspect, a method includes modulating an unregulated waveform received from an electrical energy source to generate a modulated waveform, and mixing a frequency modulated component with the modulated waveform to generate a composite waveform. The method further includes demodulating the composite waveform to controllably regulate the composite waveform.

In still yet another aspect, an aerospace vehicle includes a fuselage and wing assemblies and an empennage operatively coupled to the fuselage, an electrical energy source coupled to the at least one propulsion unit. An electrical energy regulation system further includes a modulation unit that receives an unregulated waveform from the source and generates a modulated waveform, and a mixing unit that introduces a frequency modulated component into the modulated waveform to generate a composite waveform. A demodulator receives the composite waveform and controllably regulates the composite waveform.

BRIEF DESCRIPTION OF THE DRAWINGS

Preferred and alternate embodiments of the present invention are described in detail below with reference to the following drawings.

DETAILED DESCRIPTION OF THE INVENTION

The present invention relates to systems and methods for regulating and configuring electrical power systems in aircraft. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without several of the details described in the following description.

Figure 1:
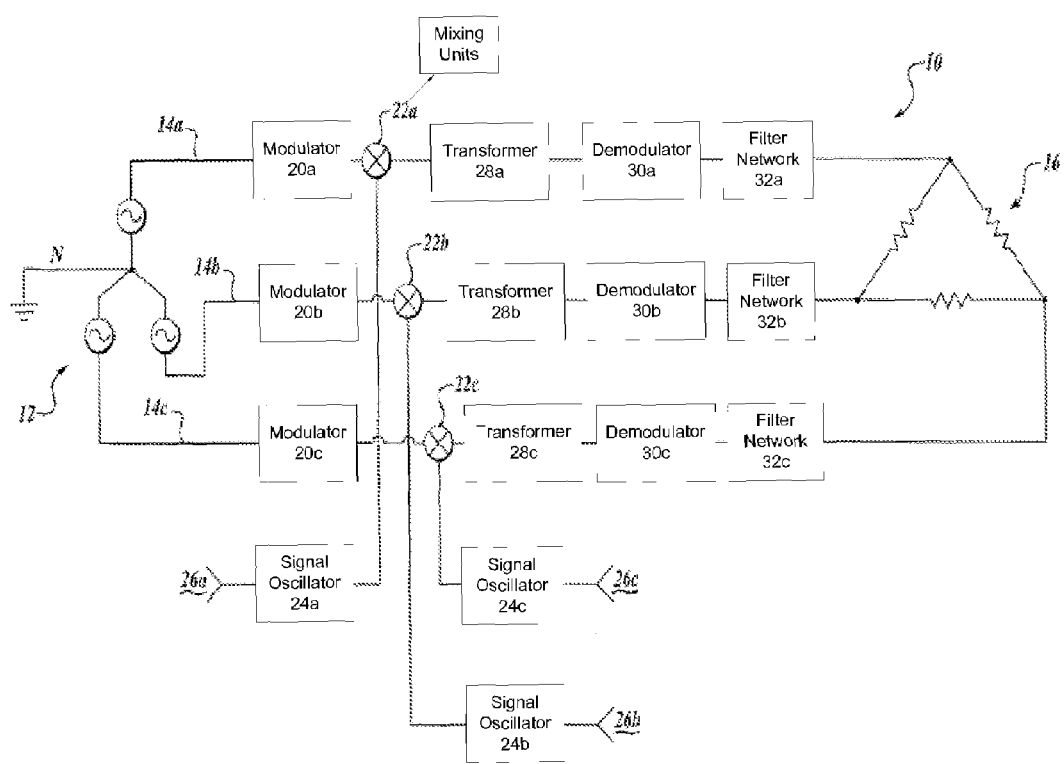
FIG. 1 is a block diagrammatic view of a power distribution system according to an embodiment of the invention.

FIG. 1 is a block diagrammatic view of a power distribution system 10 according to an embodiment of the invention. The system 10 is coupled to a three-phase power source 12, such as an aircraft alternator, or other three-phase power devices, such as a distribution transformer positioned within an aircraft. Accordingly, the system 10 includes three similar power distribution legs 14a, 14b and 14c that are coupled to respective portions of a balanced three-phase load 16. Briefly, and in general terms, each phase in the source 12 is offset from the adjacent phase by 2π/3 radians. By modulating each phase of the three-phase power source 12 with a local oscillator, each of the resulting waveforms may be algebraically combined in the balanced load 16 to yield a smooth sinusoidal waveform. An apparatus and method for modulating each of the phases of a three-phase source is disclosed in detail in U.S. Pat. No. 6,690,588 and U.S. Pat. No. 6,621,721, entitled "DIRECT CONVERSION PROGRAMMABLE POWER SOURCE CONTROLLER: THREE-PHASE INPUT WITH PROGRAMMABLE SINGLE PHASE OUTPUT", which issued on Feb. 10, 2004 and Sep. 16, 2003, respectively, and "DIRECT CONVERSION PROGRAMMABLE POWER SOURCE CONTROLLER", which issued on Oct. 15, 2002, which patents are herein incorporated by reference. Accordingly, as discussed in the foregoing U.S. patents, modulators 20a, 20b and 20c produce an output waveform by heterodyning an input waveform, which is obtained from a corresponding leg of the three-phase source 12, with a signal obtained from a local oscillator to generate a square wave at a higher frequency than the input waveform. The output waveform thus includes a high frequency carrier component and the input waveform. The output waveform of the modulators 20a, 20b and 20c will be described in further detail below.

The system 10 also includes mixing units 22a, 22b and 22c coupled to modulators 20a, 20b and 20c, respectively. The mixing units 22a, 22b and 22c are further coupled to signal oscillators 24a, 24b and 24c that are configured to receive signals 26a, 26b and 26c and to frequency modulate the output waveform from the modulators 20a, 20b and 20c. The signal oscillators 24a, 24b and 24c frequency modulate the waveforms output by the modulators 20a, 20b and 20c for a selected period of time in response to the signals 26a, 26b and 26c so that a waveform having a frequency modulated pulse is present in the waveform that is output from the mixing units 22a, 22b and 22c. The frequency-modulated pulses in each of the power distribution legs 14a, 14b and 14c may be detected by subsequent stages in the system 10 in order to control power to the load 16, as will be described in greater detail below. Preferably, low-pass filters are interposed between the modulators 20a, 20b and 20c and the mixing units 22a, 22b and 22c. The low-pass filters advantageously provide a sine wave output having low harmonic content.

The system 10 further includes transformers 28a, 28b and 28c that receive the waveforms generated by the mixing units 22a, 22b and 22c. The transformers 28a, 28b and 28c may have a predetermined turns ratio so that the waveform voltage is increased, or alternately decreased, depending on the turns ratio selected. The transformers 22a, 22b and 22c may also be isolation transformers having a 1:1 turns ratio, so that there is no voltage difference between the input waveform and the output waveform at the transformers 22a, 22b and 22c. Alternately, the transformers 28a, 28b and 28c may include transformers that are commonly mechanically coupled so that the output voltage may be selectively increased or decreased by selecting a desired tap location on windings associated with the transformers. Accordingly, a range of waveform voltages may thus be generated depending on the tap selected.

Figure 2:
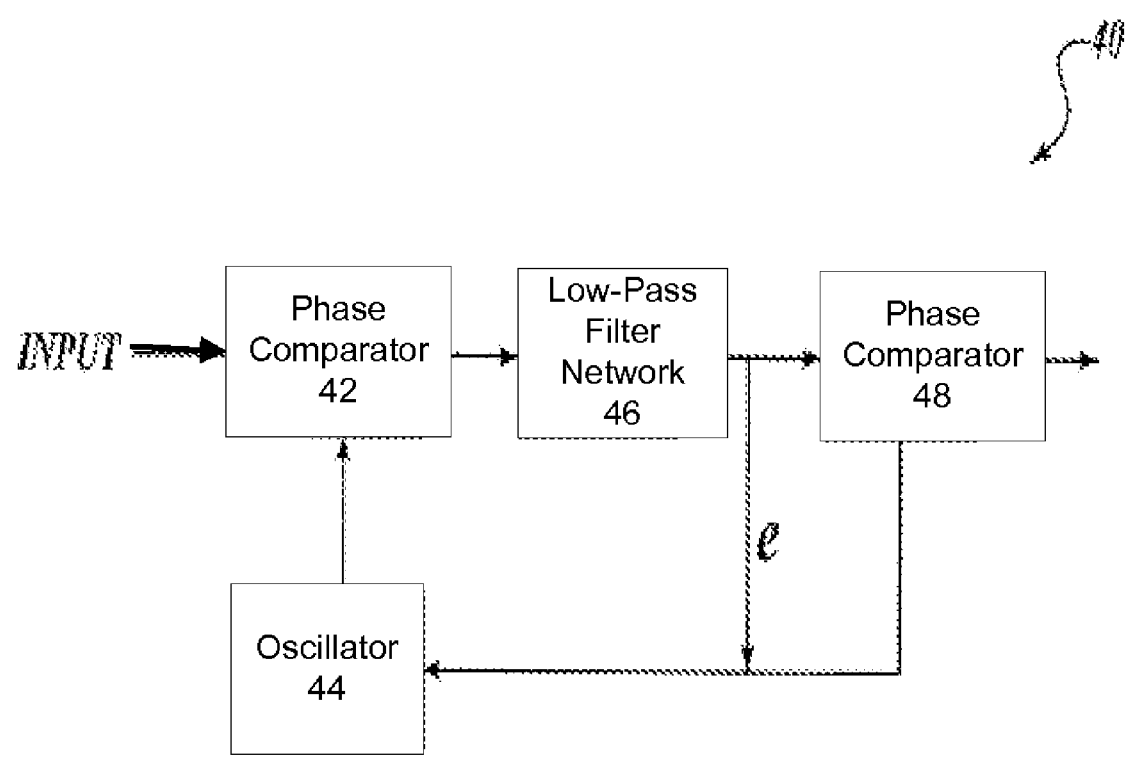
FIG. 2 is a block diagrammatic view of an embodiment of a demodulator for the system shown in FIG. 1.

Still referring to FIG. 1, the waveform output from the transformers 28a, 28b and 28c are received by demodulators 30a, 30b and 30c. The demodulators 30a, 30b and 30c are operable to receive the waveform and to separate the high frequency carrier from the waveform. With reference now to FIG. 2, an embodiment of a demodulator 40 that may be employed as the demodulators 30a, 30b and 30c will be described in greater detail. The demodulator 40 includes a phase comparator 42 that receives the signals from a selected one of the transformers 28a, 28b and 28c. The phase comparator 42 is coupled to a voltage-controlled oscillator 44 that is operable to generate a periodic waveform at a prescribed frequency. The voltage-controlled oscillator 44 changes frequency in order to contemporaneously track the frequency of the signals received from a selected one of the transformers 28a, 28b and 28c. The frequency of the input waveform and the frequency of the periodic waveform may be simultaneously compared in the phase comparator 42 and the output from the phase comparator 42 is then transferred to a low-pass filter network 46. An error signal (e) is generated by the phase comparator 42 that is, in one particular embodiment, proportional to the time difference between the input waveform and the output frequency from the voltage-controlled oscillator 44, which is fed back to the voltage controlled oscillator 44, and is also communicated to a switch 48 that is operable to control the output of the demodulator 40 in response to the error signal. For example, the magnitude of the error signal may be used to interrupt power transferred from the source 12 to the load 16.

Returning briefly to FIG. 1, the power distribution system 10 further includes filter networks 32a, 32b and 32c that receive waveforms output by the demodulators 30a, 30b and 30c. The filter networks 32a, 32b and 32c may include any combination of passive electrical elements, including resistors, capacitors and inductors that are operable to suppress the higher order odd-harmonics present in the square wave. Accordingly, the passive electrical elements may be arranged to form any of the well-known Butterworth or Chebyshev configurations, which may further include any order sufficient to provide a desired degree of harmonic suppression, although other filter designs (e.g., Elliptic and Bessel configurations) are known and may also be used. Alternately, the filter networks 32a, 32b and 32c may include active filter devices that use an operational amplifier ("op-amp") in combination with resistors and capacitors to operably provide the desired suppression of the higher-order harmonics present in the square wave received from the demodulation units 30a, 30b and 30c.

Figure 3:
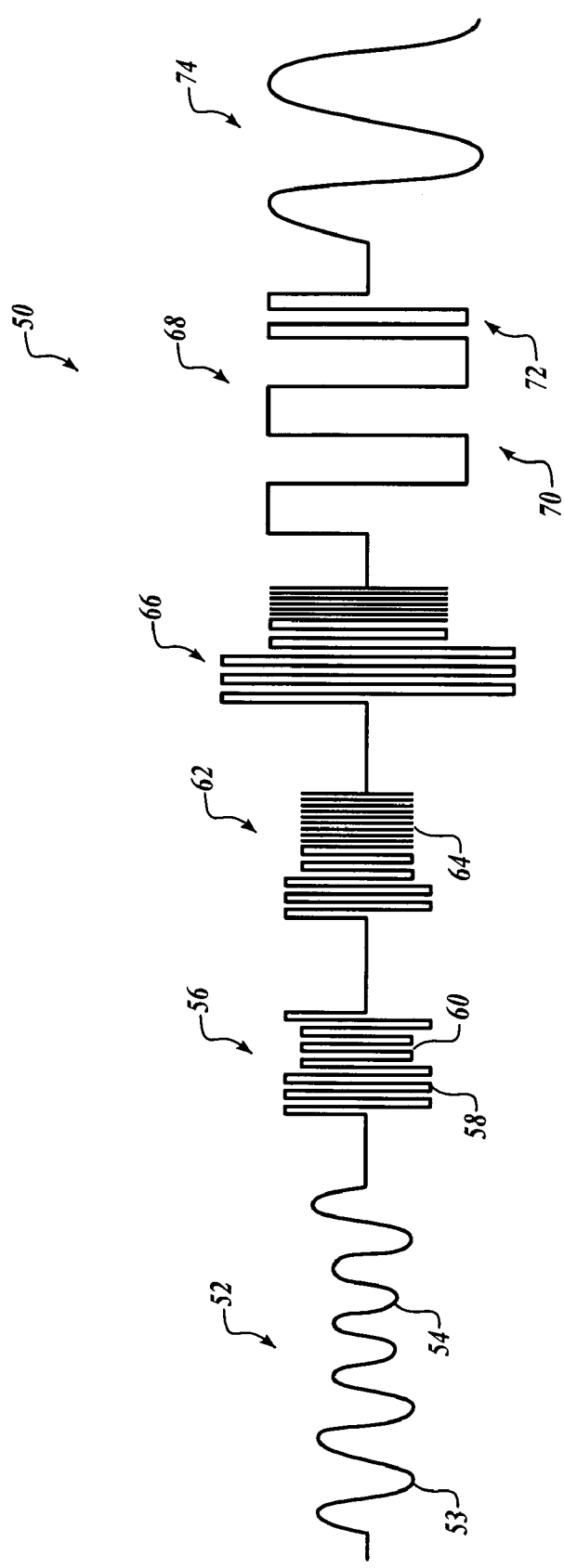
FIG. 3 is a schematic waveform representation that qualitatively describes the operation of the system of FIG. 1.

FIG. 3 is a schematic waveform representation 50 that will be used to qualitatively describe the operation of the power distribution system 10. With continued reference to FIG. 1, an input waveform 52 is received from a selected one of the power distribution legs 14a, 14b and 14c, and is a generally sinusoidal waveform having a frequency of approximately about 400 Hz. The waveform 52 includes a first portion 53 having a first amplitude, and a second portion 54 having a second amplitude that differs from the first amplitude. The first portion 52 and the second portion 54 may result from rotational speed differences imparted to the alternator, or from abrupt changes in electrical loading, or from still other differences. Following modulation of the waveform 52 in a selected one of the modulators 20a, 20b and 20c, a modulated square-wave waveform 56 is generated having a selected carrier frequency. In one embodiment of the invention, the carrier frequency is in a range extending between approximately 40 kHz and approximately 150 kHz. In a particular embodiment, however, the carrier frequency is at least about 100 kHz. The waveform 56 also includes a first portion 58 and a second portion 60 having amplitudes generally corresponding to the first portion 53 and the second portion 54 of the waveform 52.

The waveform 62 includes a frequency-modulated pulse 64 that is introduced by a selected one of the signal oscillators 24a, 24b and 24c in response to a corresponding one of the signals 26a, 26b and 26c. The frequency-modulated pulse 66 may be within approximately about 20 kHz of the carrier frequency, and in one particular embodiment, the frequency-modulated pulse is within approximately about 10 kHz of the carrier frequency. The waveform 62 is then introduced into a selected one of the transformers 28a, 28b and 28c to yield the waveform 66. Although FIG. 3 shows the waveform 66 as a replication of the waveform 62 except for an overall increase in amplitude, it is understood that the waveform 66 may also be reduced in amplitude relative to the waveform 62, or it may have approximately the same amplitude, depending on the turns ratio of the selected one of the transformers 28a, 28b and 28c.

Still referring to FIG. 3, the waveform 68 results from the demodulation of the waveform 66 in a selected one of the demodulators 30a, 30b and 30c. Accordingly, the waveform 68 includes a demodulated portion 70 and a frequency modulated portion 72. In order to obtain portions 70 and 72 having relatively equal amplitudes, a limiter stage may be optionally interposed between the transformers 28a, 28b and 28c and the demodulators 30a, 30b and 30c. The waveform 68 is then filtered in the filter networks 32a, 32b and 32c so that a sinusoidal waveform 74 results. Since the filter networks 32a, 32b and 32c are configured to pass only a selected harmonic of the waveform 68, all harmonics of the frequency modulated portion 72 are removed from the sinusoidal waveform 74.

Figure 4:
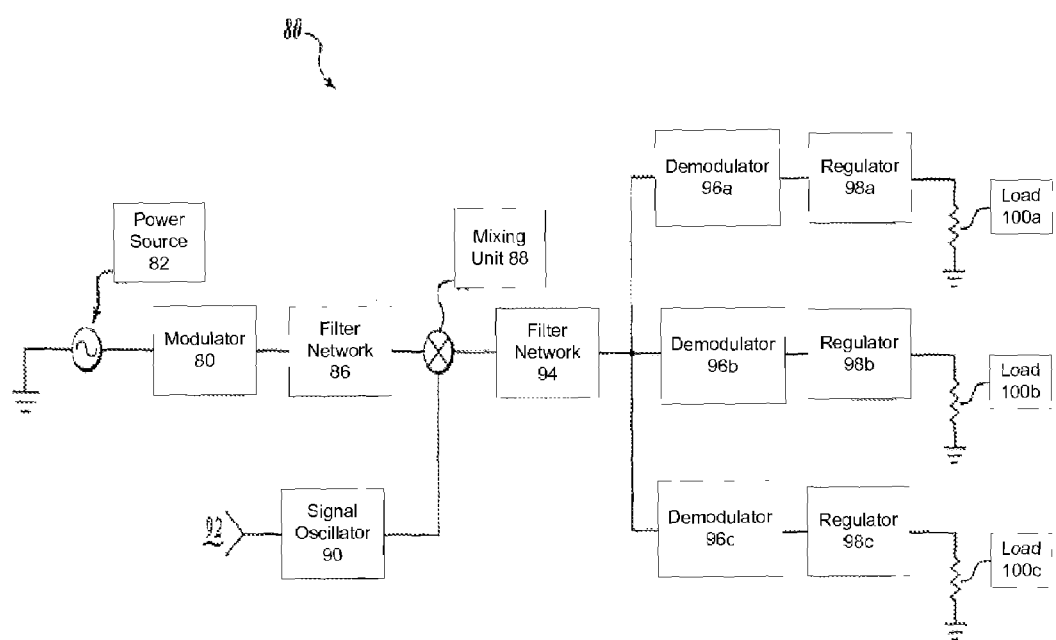
FIG. 4 is a block diagrammatic view of a power distribution system according to another embodiment of the invention.

FIG. 4 is a block diagrammatic view of a power distribution system 80 according to another embodiment of the invention. In contrast to the foregoing embodiment, the system 80 is configured to be coupled to a single-phase power source 82, which may comprise a single distribution leg of a three-phase power source, such as an aircraft alternator, or other single-phase power sources. A modulator 84 is coupled to the single-phase power source 82 and receives an input waveform, which is generally a 400 Hz sine wave having a time-varying amplitude. The output waveform from the modulator 84 thus includes a high frequency carrier component having, in one embodiment, a frequency of approximately about 100 kHz and having a wave shape that modulates the input waveform, as previously described.

The system 80 also includes a filter network 86 that generally includes any passive filter configuration operable to suppress the higher order odd-harmonics present in the wave output from the modulator 84. Alternately, the filter network 86 may include an active filter device to operably provide the desired suppression of the higher-order harmonic content present in the wave output from the modulator 84. A mixing unit 88 is coupled to the filter unit 86 and is further coupled to a signal oscillator 90 that are receives a signal 92 that frequency modulates the output waveform from the filter network 86 so that the waveform has a frequency modulated pulse. The generated waveform is transferred to a transformer 94 that is operable to increase or decrease an amplitude of the received waveform. Alternately, the amplitude of the frequency-modulated waveform may be generally unchanged by the transformer 94. Demodulators 96a, 96b and 96c are coupled to the transformer 94 that receive the frequency-modulated waveform and demodulates received waveform. Although FIG. 4 shows three demodulators coupled to the filter network 94, it is understood that one, two or more than three demodulators may be coupled to the transformer 94. In any case, the frequency-modulated pulses are detected in the demodulators 96a, 96b and 96c, which may control power to electrical loads 100a, 100b and 100c, as described in detail in connection with the previous embodiment. Regulators 98a, 98b and 98c are coupled to the demodulators 96a, 96b and 96c to regulate at least one of power, voltage and current delivered to the loads 100a, 100b and 100c.

Figure 5:
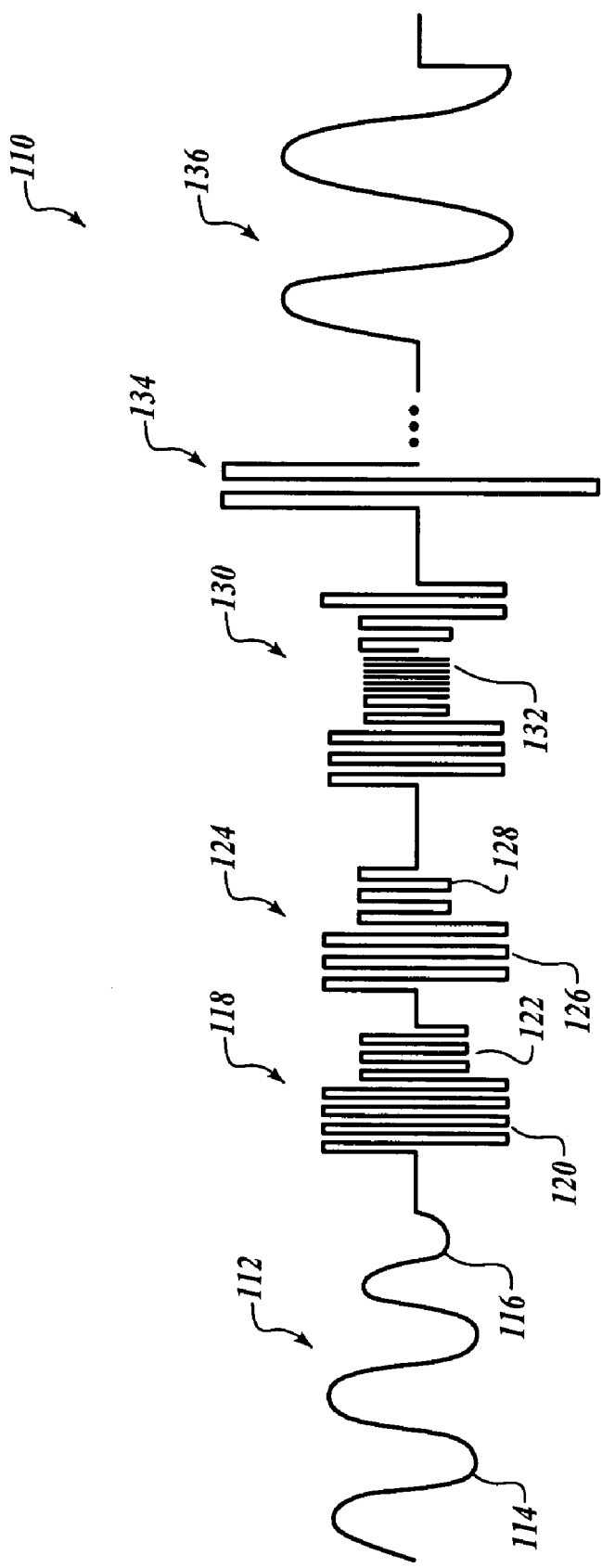
FIG. 5 is a schematic waveform representation that qualitatively describes the operation of the system of FIG. 4.

FIG. 5 is a schematic waveform representation 110 that will be used to qualitatively describe the operation of the power distribution system 80. Referring still to FIG. 4, an input waveform 112 is received from the power source 82, which is a generally sinusoidal waveform having, in one embodiment, a frequency of approximately about 400 Hz. The waveform 52 includes a first portion 114 having a first amplitude, and a second portion 116 having a second amplitude that differs from the first amplitude. Following modulation of the waveform 112 in the modulator 84, a modulated waveform 118 is generated having a selected carrier frequency. The carrier frequency ranges between approximately 40 kHz and approximately about 150 kHz. The modulated waveform 118 also includes a first portion 120 and a second portion 122 having amplitudes generally corresponding to the first portion 114 and the second portion 116 of the waveform 112.

The waveform 118 is then filtered in the filter network 86 so that a sinusoidal waveform 124 is obtained having a selected spectral content. The waveform 124 includes a first portion 126 and a second portion 128 having different amplitudes that correspond to the first portion 120 and the second portion 122 of the waveform 118. The waveform 124 then passes through the mixing unit 88 so that a waveform 130 having a frequency-modulated component 132 is generated. The component 132 is introduced by the signal oscillator 90 in response to the signal 92. The waveform 130 is then introduced into the transformer to yield the waveform 134, which is generally a replication of the waveform 130. It is understood, however, that the waveform 134 may also be reduced in amplitude relative to the waveform 130, or it may have approximately the same amplitude, depending on the turns ratio of the transformer 94.

With reference still to FIG. 5, a waveform 136 results from the demodulation of the waveform 134 in a selected one of the demodulators 96a, 96b and 96c, as previously described. The demodulated waveform 136 may then be regulated in order to obtain a relatively constant amplitude in terms of voltage, current and power.

Figure 6:
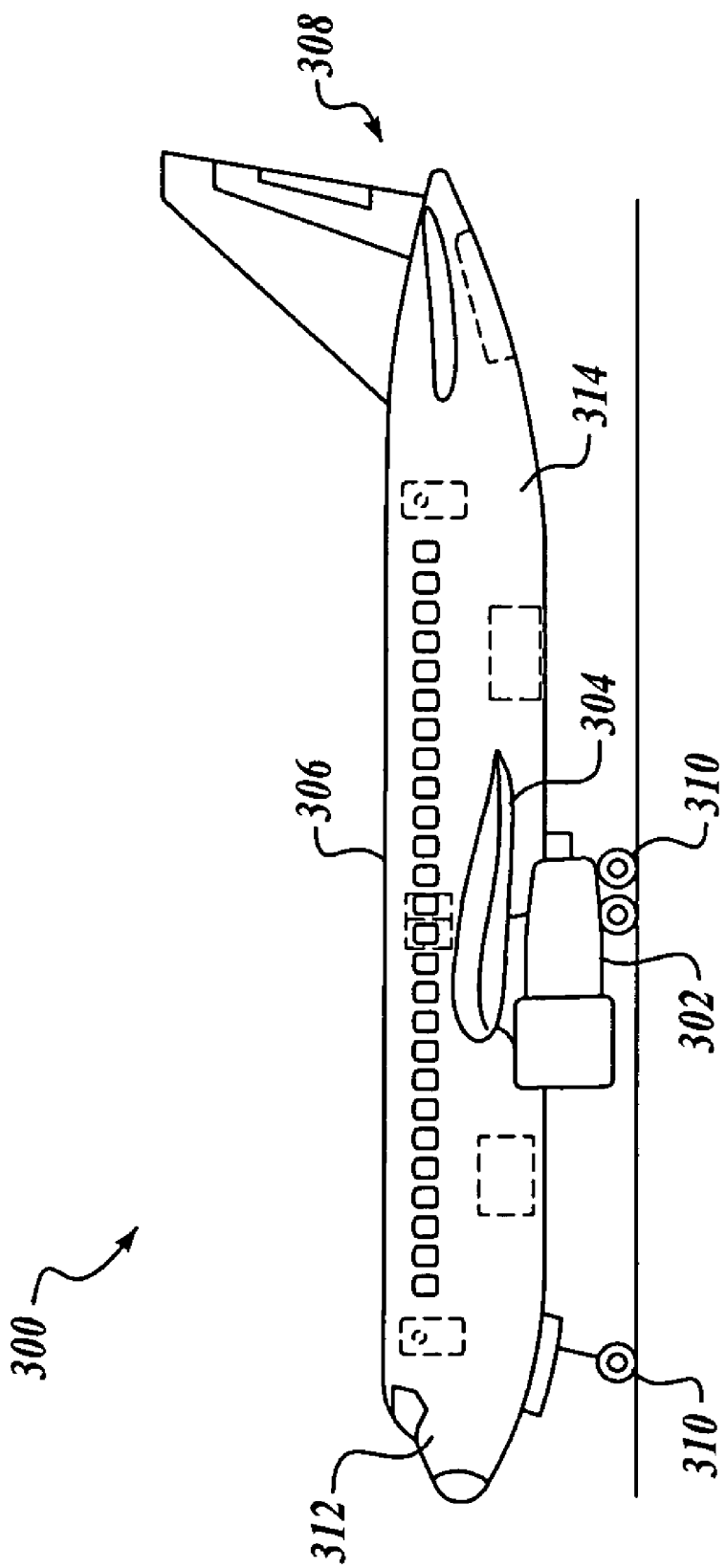
FIG. 6 is a side elevation view of an aircraft having one or more of the disclosed embodiments of the present invention.

Those skilled in the art will also readily recognize that the foregoing embodiments may be incorporated into a wide variety of different systems. Referring now in particular to FIG. 6, a side elevation view of an aircraft 300 having one or more of the disclosed embodiments of the present invention is shown. With the exception of the embodiments according to the present invention, the aircraft 300 includes components and subsystems generally known in the pertinent art, and in the interest of brevity, will not be described in detail. The aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. The aircraft 300 further includes other systems and subsystems generally required for the proper operation of the aircraft 300. For example, the aircraft 300 includes a flight control system 312 (not shown in FIG. 6), as well as a plurality of other electrical, mechanical and electromechanical systems that cooperatively perform a variety of tasks necessary for the operation of the aircraft 300. Accordingly, the aircraft 300 is generally representative of a commercial passenger aircraft, which may include, for example, the 737, 747, 757, 767 and 777 commercial passenger aircraft available from The Boeing Company of Chicago, Ill. Although the aircraft 300 shown in FIG. 6 generally shows a commercial passenger aircraft, it is understood that the various embodiments of the present invention may also be incorporated into flight vehicles of other types. Examples of such flight vehicles may include manned or even unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK.

With reference still to FIG. 6, the aircraft 300 may include one or more of the embodiments of the electrical power regulation and distribution system 314 according to the present invention, which may operate in association with the various systems and sub-systems of the aircraft 300. Although the foregoing embodiments of the invention relate specifically to aircraft systems, it is understood that electrical power generation systems are nevertheless present in other types of vehicles, including various forms of terrestrial vehicles such as ground and marine vehicles, which may utilize the various embodiments of the present invention without significant modification. Furthermore, it is understood that the various embodiments of the present invention may also be employed in stationary power generation systems.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A distribution system for controlling an unregulated output waveform from a power source, comprising:
    a modulator coupled to the power source that receives the unregulated output waveform and is operable to produce a first composite waveform;
    a mixing unit coupled to the modulator that is operable to generate a second composite waveform by introducing a frequency modulated component into the first composite waveform;
    a demodulator coupled to the mixing unit that demodulates the second composite waveform and generates a third composite waveform, wherein the demodulator includes:
        an error determination component configured to output an error signal based on a difference between the second composite waveform and a periodic waveform; and
        a switch configured to receive the error signal and to control output of the third composite waveform based on the error signal;
    a transformer interposed between the demodulator and the mixing unit that includes a plurality of taps that are individually selectable to provide a desired transformation of the second composite waveform; and
    a filter network coupled to the demodulator that receives the third composite waveform and configured to select a desired spectral portion of the third composite waveform, the third composite waveform being coupled to a load.

2. The system of claim 1, wherein a low-pass filter is interposed between the modulator and the mixing unit, the mixing unit being further coupled to a signal oscillator that is operable to receive an input signal and to generate the frequency modulated component corresponding to the input signal.

3. The system of claim 1, wherein the demodulator is operable to detect the frequency modulated component and to control the transfer of the third composite waveform.

4. The system of claim 1, wherein the error determination component includes:
    an oscillator configured to output the periodic waveform having an output frequency; and
    a phase comparator configured to output the error signal based on a difference between a frequency of the second composite waveform and the output frequency of the periodic waveform.

5. The system of claim 4, wherein the switch is responsive to the frequency modulated component.

6. The system of claim 1, wherein the switch controls the output waveform of the demodulator to the filter network based upon the response of the error signal.

7. The system of claim 1, wherein the filter network further comprises an active or passive filter device.

8. The system of claim 1, wherein the first composite waveform further comprises a first square wave portion corresponding to a first portion of the unregulated output waveform, and a second square wave portion corresponding to a second portion of the unregulated output waveform, the first portion of the unregulated output having at least a different amplitude than the second portion of the unregulated output waveform.

9. The system of claim 1, wherein the second composite waveform further comprises a first square wave portion having a first frequency and a second square wave portion having a second frequency different from the first frequency.

10. A power control and regulation system, comprising:
    a modulator coupled to an alternating current (AC) power source that generates an unregulated waveform;
    a filter network coupled to the modulator that is operable to receive a modulated waveform from the modulator and generate a filtered waveform having a predetermined spectral composition, the filtered waveform including a first sine wave portion having a first amplitude and a second sine wave portion having a second amplitude different from the first amplitude;
    a mixing unit coupled to the filter network that is operable to introduce a frequency modulated component into the filtered waveform;
    at least one demodulator coupled to the mixing unit that demodulates the filtered waveform and generates a demodulated waveform, wherein the demodulator includes:
        an error determination component configured to output an error signal based on a difference between the second composite waveform and a periodic waveform; and a switch configured to receive the error signal and to control output of the third composite waveform based on the error signal; and a regulation stage coupled to the at least one demodulator and configured to receive the demodulated waveform and to regulate at least one of a power, a voltage and a current delivered to a load.

11. The system of claim 10, wherein a low-pass filter is interposed between the modulator the mixing unit, the mixing unit being further coupled to a signal oscillator that is operable to receive an input signal and to generate the frequency modulated component eouesponding to the input signal.

12. The system of claim 10, further comprising a transformer interposed between the mixing unit and the demodulator that alters an amplitude of the filtered waveform.

13. The system of claim 10, further comprising a transformer interposed between the mixing unit and the demodulator that electrically isolates the mixing unit and the demodulator.

14. The system of claim 10, further comprising a transformer interposed between the mixing unit and the demodulator that includes a plurality of taps that are individually selectable to provide a desired transformation of the filtered waveform.

15. The system of claim 10, wherein the demodulator is operable to detect the frequency modulated component and to control the transfer of the demodulated waveform.

16. The system of claim 10, wherein the demodulator further comprises a phase comparator that receives the filtered waveform and compares a frequency of the filtered waveform to a periodic waveform generated by a voltage controlled oscillator coupled to the phase comparator.

17. The system of claim 16, wherein the demodulator further comprises a switch that is responsive to the frequency modulated component.

18. The system of claim 17, wherein the switch controls the demodulated waveform of the demodulator to the regulation stage based upon the response of the error signal.

19. The system of claim 10, wherein the filter network further comprises an active or passive filter device.

20. The system of claim 10, wherein the error determination component includes:

an oscillator configured to output the periodic waveform having an output frequency; and a phase comparator configured to output the error signal based on a difference between a frequency of the second composite waveform and the output frequency of the periodic waveform.

21. A power control and regulation system, comprising:
a modulator coupled to an alternating current (AC) power source that generates an unregulated waveform;
a filter network coupled to the modulator that is operable to receive a modulated waveform from the modulator and generate a filtered waveform having a predetermined spectral composition;
a mixing unit coupled to the filter network that is operable to introduce a frequency modulated component into the filtered waveform;

at least one demodulator coupled to the mixing unit that demodulates the filtered waveform and generates a demodulated waveform, wherein the demodulator includes:

an error determination component configured to output an error signal based on a difference between the second composite waveform and a periodic waveform; and a switch configured to receive the error signal and to control output of the third composite waveform based on the error signal;

a transformer interposed between the mixing unit and the demodulator that includes a plurality of taps that are individually selectable to provide a desired transformation of the filtered waveform; and a regulation stage coupled to the at least one demodulator and configured to receive the demodulated waveform and to regulate at least one of a power, a voltage and a current delivered to a load.

22. The system of claim 21, wherein a low-pass filter is interposed between the modulator the mixing unit, the mixing unit being further coupled to a signal oscillator that is operable to receive an input signal and to generate the frequency modulated component corresponding to the input signal.

23. The system of claim 21, wherein the demodulator is operable to detect the frequency modulated component and to control the transfer of the demodulated waveform.

24. The system of claim 21, wherein the demodulator further comprises a phase comparator that receives the filtered waveform and compares a frequency of the filtered waveform to a periodic waveform generated by a voltage controlled oscillator coupled to the phase comparator.

25. The system of claim 24, wherein the demodulator further comprises a switch that is responsive to the frequency modulated component.

26. The system of claim 25, wherein the switch controls the demodulated waveform of the demodulator to the regulation stage based upon the response of the error signal.

27. The system of claim 21, wherein the filter network further comprises an active or passive filter device.

28. The system of claim 21, wherein the error determination component includes:

an oscillator configured to output the periodic waveform having an output frequency; and a phase comparator configured to output the error signal based on a difference between a frequency of the second composite waveform and the output frequency of the periodic waveform.

29. The system of claim 21, wherein the filtered waveform further comprises a first sine wave portion having a first amplitude and a second sine wave portion having a second amplitude different from the first amplitude.

* * * * *